United States Patent

Tveten et al.

[11] Patent Number: 5,120,514
[45] Date of Patent: Jun. 9, 1992

[54] PROCESS FOR PRODUCTION OF MAGNESIUM CHLORIDE

[75] Inventors: Kjell W. Tveten, Skien; Glor T. Mejdell; Jan B. Marcussen, both of Porsgrunn, all of Norway

[73] Assignee: Norsk Hydro a.s., Oslo, Norway

[21] Appl. No.: 534,277

[22] Filed: Jun. 7, 1990

[30] Foreign Application Priority Data

Jun. 9, 1989 [NO] Norway ............................ 892374

[51] Int. Cl.$^5$ .......................... C01F 5/30; C01F 5/32
[52] U.S. Cl. ................................. 423/155; 423/163; 423/178; 423/497; 423/478; 204/70
[58] Field of Search .............. 423/497, 498, 155, 158, 423/178, 163; 204/70

[56] References Cited

U.S. PATENT DOCUMENTS

| | | | |
|---|---|---|---|
| 4,248,839 | 2/1981 | Toomey et al. | 423/178 |
| 4,504,369 | 3/1985 | Keller | 204/70 |
| 4,743,347 | 5/1988 | Harris et al. | 204/60 |

FOREIGN PATENT DOCUMENTS

| | | | |
|---|---|---|---|
| 449993 | 6/1973 | U.S.S.R. | 204/70 |
| 498369 | 6/1974 | U.S.S.R. | 204/70 |

Primary Examiner—Michael Lewis
Assistant Examiner—Brian M. Bolam
Attorney, Agent, or Firm—Wenderoth, Lind & Ponack

[57] ABSTRACT

Process for production of magnesium chloride with sufficient purity for the production of magnesium metal, by leaching a magnesium containing raw material in hydrochloric acid. It is essential to keep the ratio between acid soluble iron and nickel greater than 120 and the ratio between acid soluble iron and phosphorus greater than 20 in the primary magnesium chloride solution, to obtain a sufficiently pure product. The acid soluble iron can partly or completely be substituted by an equal, molar amount of acid soluble aluminium. It is especially preferred to use mixtures of macro- and crypto-crystalline magnesites in the ratio 1:10-10:1 as raw material.

7 Claims, 1 Drawing Sheet

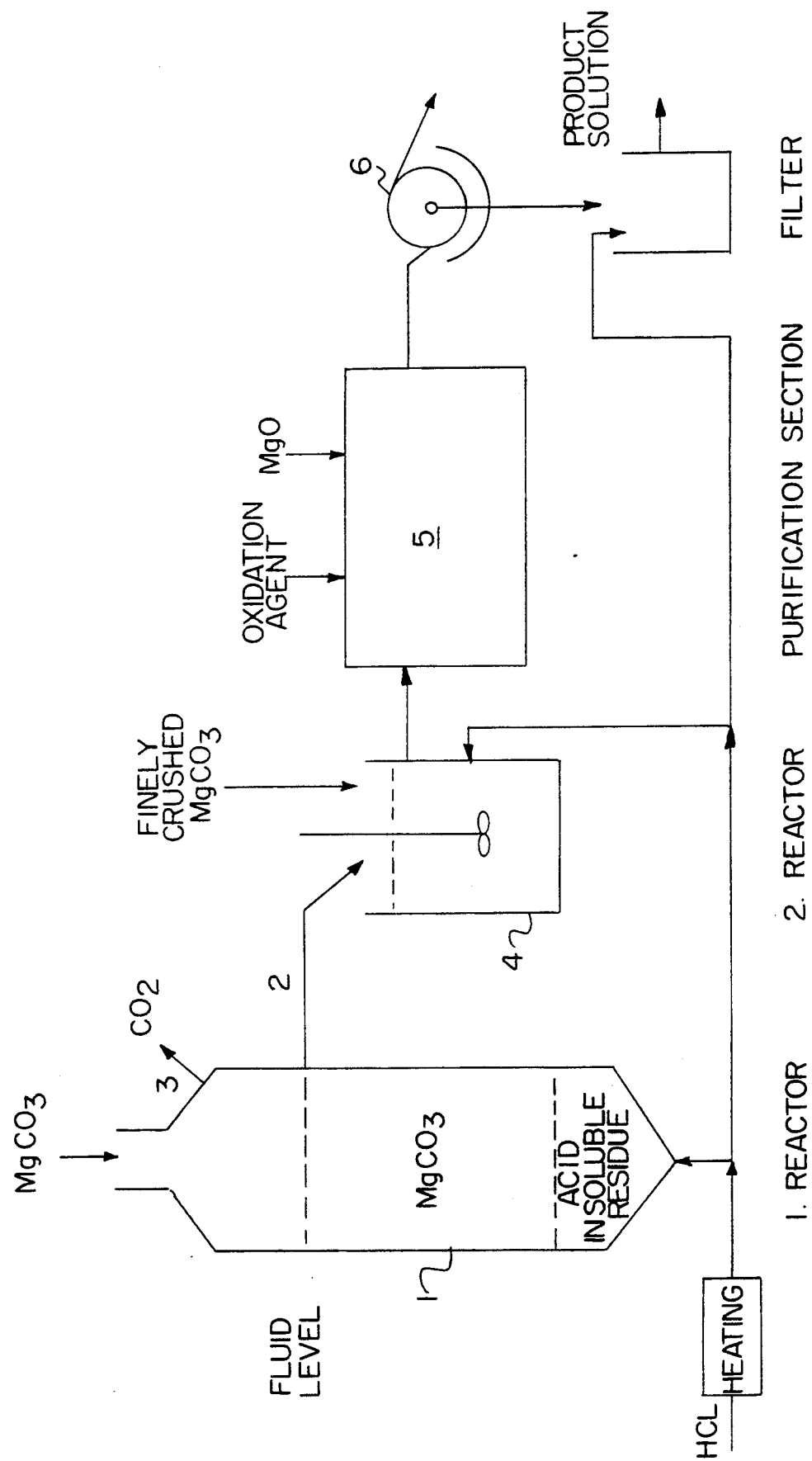

PROCESS FOR PRODUCTION OF MAGNESIUM CHLORIDE

BACKGROUND OF THE INVENTION

The present invention concerns a method for production of magnesium chloride of sufficiently high purity for production of magnesium metal, by dissolving magnesium containing ore in hydrochloric acid and with subsequent purification of the raw solution by precipitation of unwanted impurities.

Magnesite from different sources and of different qualities might play an important part in the future production of magnesium metal-based on this method. Its content of impurities shows great variations, concerning the most critical elements for a subsequent electrolytic metal production. Iron can be found in concentrations between 0.012 and 2-3%, nickel in the range from 3 to 180 ppm and phosphorus from 5 to 500 ppm in the ores.

Another possible source for the magnesium chloride production is brucite ($Mg(OH)_2$). Its purity is comparable to good qualities of magnesite. Olivin, a magnesium silicate, has a potential as a raw material as well as precipitated $Mg(OH)2$ from the seawater/dolomite process. Also, asbestos tailings could be used for this purpose.

The requirements for a high current efficiency as well as existing specifications for the metal, demands a high degree of purity in the purified brine product. For example the nickel content must not exceed 0.1-0.2 ppm if the corrosion properties shall be maintained. The phosphorus content must be kept below 1 ppm to avoid the formation of malodorous phosphines from moistened metal surfaces.

The invention applies to the first stage in a dissolution process, e.g. as it is described in Norwegian patent No. 161 851. According to this patent a first reactor is filled with magnesite lumps (5-400 mm). The magnesite is dissolved by feeding hot, concentrated hydrochloric acid into the bottom of the reactor, and the resulting solution is drained off some distance below the top, in such a way that a layer of magnesite is situated above the fluid level. Magnesite lumps (5-400 mm) are fed to the top of the reactor as it is consumed and sink downwards in the reactor.

The dissolution reaction is finished in the second reactor. The composition of the solution is adjusted by supplying either finely crushed magnesite if the solution contains an excess of unreacted acid, or concentrated hydrochloric acid if the solution has an excess of magnesite particles.

Further in the process, iron and other heavy metals are removed after oxidation, by precipitation as hydroxides.

Magnesite is one of the ores which is preferred as raw material for production of magnesium chloride according to this process, but other magnesium containing ores could also be used. As earlier said, magnesite is present in nature in different qualities and of different reactivity, dependent on the place of origin. The magnesite can be divided into two main types of ores:

Macrocrystalline magnesite consists of aggregates of single crystals with a diameter greater than 1 mm, and cryptocrystalline has grains smaller than 1/100 mm. While the first type is found as lodes in sedimentary rocks, the cryptocrystalline magnesites are present as single nodules in sand- or clay-containing materials.

As the grain boundaries seem to be the first to be attacked during the dissolution process, resulting in liberation of the individual crystals, there are great differences up to 1000 times) in the reactivity between macro- and cryptocrystalline material.

The two types react differently during the dissolution process and both have advantages and drawbacks as raw material for the magnesium chloride production.

Macrocrystalline magnesites react relatively slow with hydrochloric acid. To obtain acceptable production loads and degree of conversion, the acid must in practice be preheated so that the reaction can be carried out at temperatures between 70° and 100° C. The capacity of the reactor is thereby limited to what quantity of hydrochloric acid vapor can be accepted, which must be recovered from the carbon dioxide.

Several of these magnesites have a low content (1-2%) of components being insoluble in acid. These are partly present as separate single crystals in the size of about 1 mm, and which therefore to a great extent are transported out with the fluid flow. Thereby the reactor should have a reasonably long operating time before it must be emptied of insoluble particles.

Cryptocrystalline magnesites react as earlier mentioned, much faster (1000 times) than the macrocrystalline. The reaction can therefore be carried out at a lower temperature. The solution leaving the reactor is therefore practically neutral, so that the acid losses in the waste gas are negligible. The single crystals, however, are liberated substantially faster than they are consumed by the reaction. The solution leaving the reactor can contain a quantity of the liberated mini particles, which dependent on working conditions and flow, can correspond to until 50-100% of the quantity which has reacted with the acid.

To utilize the magnesity grains in this suspension a corresponding quantity of acid must be added to the second leaching reactor. Such a high content of mini crystals easily leads to exceeding the reactor capacity, leading to overfoaming caused by liberated carbon dioxide, a phenomena which is increased because the particles stabilize the foam production.

Another disadvantage of cryptocrystalline magnesites, because of their origin, is that they contain variable quantities of silicates which react with the acid under formation of hydrated silica, partly in the shape of a voluminious sludge which follows the solution and is removed together with the heavy metals in the filter after the purification process, and partly form porous particles of $SiO_2$ having a size of until up to several cm in diameter.

While the $SiO_2$ sludge at worst gives a certain lowering of the filterability, the greater $SiO_2$-frameworks will lead to the reactor becoming rapidly filled with undissolved components, resulting in short operation periods between each time the reactor must be emptied and cleaned. This also could be the result when using other magnesium containing raw materials with a high content of silica.

A further defect with these magnesite minerals is that they normally have a lower Fe/Ni-ratio than the optimal ratio for removal of nickel during the purification process, so that extra supply of iron ions will be necessary.

SUMMARY OF THE INVENTION

It is an object of the invention to obtain a sufficient removal of impurities, especially Ni and P, in a magnesium chloride solution. Another object is to be able to use a raw material composition giving small amounts of undissolved components in the reactor and at the same time yielding as small a hydrochloric acid loss in the waste gas as possible. It is important also to prevent accumulation of hydrous silica caused by $SiO_2$-frameworks in cryptocrystalline ore, when magnesite is used as raw material. It is also desirable to gain increased acid load with sufficient reaction rate to thereby increase the reactor capacity.

These objects of the invention are obtained by a process described below.

It has been found that in the purification process a sufficient removal of nickel and phosphorus is dependent on a simultaneous precipitation of ferric hydroxide or aluminum hydroxide. It is essential to maintain a sufficiently high proportion between dissolved iron and nickel and between dissolved iron and phosphorus in the primary magnesium chloride solution to obtain satisfactory removal of nickel and phosphorus in the subsequent purification process. It was found that the of ratio acid soluble Fe/Ni should be greater than about 120 to obtain this. The value is empirical. A similar effect is achieved for the removal of phosphorus. The ratio Fe/P necessary to give a satisfactory low P concentration lies in the range greater than about 20, and the value is empirical as well. It was also found that the same effect can be obtained by partial or complete substitution of iron with an equal, molar amount of acid soluble aluminum. When aluminum is used, the ratio Al/P should be greater than 5 to get a sufficient removal of the impurities.

BRIEF DESCRIPTION OF THE DRAWING

The drawing schematically shows the process of the present invention.

DETAILED DESCRIPTION OF THE INVENTION

Most of the nickel present will be precipitated as nickel hydroxides during the purification process. However, it has been a problem to get a sufficient removal of the remaining Ni content. The effect is based on the fact that precipitated trivalent hydroxides apparently will occlude Ni-ions among other things by an excess of MgO. The same effect is supposed to take place with removal of the remaining phosphorus ions. This effect will apply to most magnesium containing raw materials which are, in actual production of magnesium chloride solution, sufficiently pure to be used for production of magnesium metal.

When the iron content in the raw material is too low, iron must be supplied. The easiest and cheapest way will be to mix the raw material with an ore more rich in iron. Of course iron also could be added in another form, e.g. as scrap material, and also directly into the magnesium chloride containing primary solution as an iron containing solution. The same will be true for aluminum. If the ore has a too low a content of aluminum, this could be supplied through mixture with other raw materials or added as a solution. If the ore contains both iron and aluminum, the removal of Ni and P could be effected by a precipitation of both aluminum and iron hydroxides.

When using magnesite as raw material, it has surprisingly been found that a mixture of cryptocrystalline and macrocrystalline magnesite to a great extent gives the advantages of both, while the disadvantages are reduced substantially more than corresponding to the proportion of the mixture. A synergistic effect therefore seems to occur when the magnesite is supplied in a mixture. The mixture of macro- and cryptocrystalline magnesites is used in the ratio 1:10-10:1, preferably 1:5-5:1. The ratio of the mixture must be adapted so that an optimal production capacity and operating time is obtained.

The iron contents in magnesite minerals differ a great deal. Many of these minerals have a lower Fe/Ni-ratio and Fe/P-ratio than is optimal for removal of nickel and phosphorus during the purification process, so that extra supply of iron ions will be necessary. This can also be done by mixing the magnesite raw material used with a magnesite with higher iron content.

By supplying cryptocrystalline magnesite in mixture with macrocrystalline material, the acid content in the solution leaving the reactor and the loss of hydrochloric acid in the waste gas will be very moderate compared to use of macrocrystalline magnesite alone, when the acid load of the reactor is considerably increased. The content of liberated magnesite mini particles is strongly reduced compared to what is obtained with a cryptocrystalline raw material alone. Accumulation of undissolved particles in the bottom of the reactor also appeared to be considerably lower than what should be expected from an additive calculation from the consumption of each of the two components.

By inspection of the content of the reactor after a period of operation it was experienced that the lower part of the reactor above the layer of acid insoluble residues mainly contained macrocrystalline material; lumps more or less were attacked by the acid and liberated small crystals (about 1 mm), together with some few undissolved residues ($SiO_2$ frameworks) from cryptocrystalline material.

In the upper part of the reactor below the fluid outlet, the macrocrystalline lumps just show signs of a modest attack from the acid, while the quantity and size of cryptocrystalline particles decreased relatively fast downwards in the reactor.

The cause of the favorable effect on the quantity of accumulated acid insoluble residues in the reactor probably could be related to the complete reaction of cryptocrystalline material in the upper part of the reactor where the flow pattern is very turbulent because of the carbon dioxide gas which is released in the lower part of the reactor. It is reasonable to believe that this turbulence causes a sort of erosion or wear and tear on the pieces so that the $SiO_2$-coatings are released and transported out together with the fluid. Analysis for $SiO_2$ in the fluid outlet also confirms that a greater part of the Si-content of the magnesite is removed with the fluid when the raw materials are mixed. The process according to the invention will be further described with reference to the following examples and the enclosed figure which schematically shows the process.

EXAMPLE 1

Macrocrystalline (Chinese) magnesite in pieces of 5-25 mm and with a content of 0.2% Fe, 4 ppm Ni and 300 ppm P was leached in 30% hydrochloric acid in a reactor 1 where the fluid was 1.8 m and had a diameter of 25 om. The acid was supplied in the bottom of the reactor. The acid load was 40 l/h. The temperature in the bottom of the reactor was about 80° C., the top temperature 92° C.

Free HCl in the outlet 2 was 3-4%. HCl in the waste gas 3 corresponds to an acid loss of 7% of the HCl added.

In the second reactor 4 finely crushed magnesite was added before the solution is lead to a purification section 5 and filtration 6. This is described in more detail in Norwegian patent No. 161 851.

The Fe/Ni ratio in the acidic solution in the outlet was 500 and the Fe/P ratio was 6.7. The clear, purified solution was found to contain 0.1-0.2 mg Ni/l and 21 mg P/l.

After precipitation of impurities the amount of settled sludge made was 9-10 volume % of the suspension.

The amount of acid insoluble residue in the reactor bottom was 6.5 liters per ton of magnesite supplied.

EXAMPLE 2

Cryptocrystalline (Australian) magnesite lumps of the same size as in example 1, and with a content of 0.045% Fe, 24 ppm Ni and 5 ppm P, was leached in 30% hydrochloric acid (same reactor and acid load as in example 1). The temperature in the bottom of the reactor was 85° C. and also the temperature at the top was 85° C.

Free HCl in the solution leaving the reactor was <0.1%. The content of HCl in the waste gas corresponded to an acid loss of 0.3% of HCl supplied. The solution contained 20-30 g/l finely grained unreacted magnesite. In this case HCl was added in the second rector.

The ratio Fe/Ni was 19, and the ratio Fe/P was 90 in this ore. The clear, purified solution was found 0.8-1.3 mg Ni/l and 0.8 mg P/l.

After precipitation of the impurities the amount of settled sludge was 30-35 vol.% of the suspension.

The amount of acid insoluble residue in the reactor bottom was 17 liters per ton of magnesite supplied.

EXAMPLE 3

A mixture of 2 parts macrocrystalline magnesite of the same quality (and size) as in example 1, and 1 part cryptocrystalline of the same quality (and size) as in example 2 was leached in 30% hydrochloric acid (same reactor and acid load as in example 1). The temperature in the bottom of the reactor was 70° C. and in the top 95° C.

Free HCl in the outlet solution was <0.4%, and the solution was in practice totally free of unreacted magnesite. HCl in the waste gas corresponded to an acid loss of 0.9% of HCl supplied.

In ratio Fe/Ni was 139 and the ratio Fe/P was 7.3. In clear, purified solution was found to contain 0.1 mg Ni/l and 3 mg P/l. After precipitation of impurities the amount of purified settled sludge was 15-17 volume% of the suspension.

The amount of residue in the reactor bottom insoluble in acid was 7 liters per ton of magnesite supplied.

EXAMPLE 4

One part of a macrocrystalline magnesite rich in iron with 3.1% Fe, 25 ppm Ni and 2 ppm P, and 9 parts of a cryptocrystalline magnesite with 0.025% Fe, 14 ppm Ni and 5 ppm P, both with the same lump size as in example 1, was leached in 30% hydrochloric acid (same reactor and acid load as in example 1). The temperature in the bottom was 85° C. and at the top 86° C.

Free HCl in the outlet solution was <0.1%. HCl in the waste gas was equal to an acid loss of 0.3% of HCl supplied. The solution contained about 20 g/l microcrystalline, unreacted magnesite. Hydrochloric acid was added to the second reactor. The ratio Fe/Ni was 222 and the ratio Fe/P was 707. The clear, purified solution it was found to contain 0.1-0.2 mg Ni/l and 0.2 mg P/l. After precipitation of the impurities the amount of settled sludge was 40-45% of the suspension.

The amount of acid insoluble residue in the reactor was 12 liters per ton magnesite added.

The examples show that the acid loss caused by unreacted HCl for a mixture is almost as good as for cryptocrystalline magnesite alone. Further, the amount of acid insoluble residue in the bottom of the reactor which is due to cryptocrystalline magnesite for a mixture as in example 3, is reduced to below half, and in example 4 to about 2/3, of what was found in example 2.

The volume of the sludge using the mixture in example 3 will be a little higher than by additive calculation. This is because a part of unreacted cryptocrystalline magnesite will go into the sludge. The sludge volume therefore will increase a little more than in the corresponding additive effect of these two magnesites. By mixing the two magnesites there is gained a nickel content in the purified solution as low as in a solution from macrocrystalline magnesite.

EXAMPLE 5

A portion of brucite (a magnesium hydroxide mineral) containing 0.07% Fe, 5 ppm Ni and 25 ppm P was dissolved in 30% hydrochloric acid at 85°-90° C. in the laboratory. A small excess of sodium hypochlorite was added before neutralization and precipitation of impurities. After filtering, a clear colorless brine was developed.

The ratio Fe/Ni in the ore was 140 and the ratio Fe/P was 28. The purified brine contained less than 0.1 mg Ni/l and less than 0.3 mg P/l.

EXAMPLE 6

To a pure $MgCl_2$ brine containing about 400 g $MgCl_2$/l was added pure salts of disodium hydrogen phosphate and aluminum chloride in amounts to give 84 mg P/l and 560 mg Al/l. The ratio Al/P was 6.7. After precipitation of the impurities, the purified brine contained 0.10 mg P/l.

We claim:

1. A process for production of magnesium chloride for use in the production of magnesium metal, which comprises leaching magnesium containing ore in hydrochloric acid to obtain a primary magnesium chloride solution having a ratio in ppm between acid soluble iron and nickel kept greater than 120, and a ratio in ppm between acid soluble iron and phosphorus kept greater than 20, or wherein the acid soluble iron is partly or completely substituted by an equal, molar amount of acid soluble aluminum.

2. The process according to claim 1, wherein acid soluble iron is used to maintain both of said ratios.

3. The process according to claim 2, wherein the necessary amount of iron is added as iron containing ore.

4. The process according to claim 2, wherein the necessary amount of iron is added as an iron containing solution or as iron scrap.

5. The process according to claim 3, wherein the magnesium containing ore is a mixture of macro- and cryptocrystalline magnesites- in a ratio of 1:10–10:1.

6. The process according to claim 5, wherein the ratio between the macro- and cryptocrystalline magnesites is in the range of 1:5–5:1.

7. The process according to claim 1, wherein the acid soluble iron is partly or completely substituted by an equal, molar amount of acid soluble aluminum.

* * * * *